United States Patent
Ichiryu

(10) Patent No.: US 8,001,790 B2
(45) Date of Patent: Aug. 23, 2011

(54) GAS TURBINE

(75) Inventor: Taku Ichiryu, Hyogo-ken (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 493 days.

(21) Appl. No.: 12/189,445

(22) Filed: Aug. 11, 2008

(65) Prior Publication Data

US 2010/0031672 A1 Feb. 11, 2010

(51) Int. Cl.
*F02C 7/20* (2006.01)
(52) U.S. Cl. .............. 60/796; 60/797; 60/799
(58) Field of Classification Search .......... 60/796, 60/797, 799; 415/213.1
See application file for complete search history.

(56) References Cited

U.S. PATENT DOCUMENTS

| | | | | |
|---|---|---|---|---|
| 3,628,884 A | * | 12/1971 | Mierley, Sr. | 415/213.1 |
| 4,050,660 A | * | 9/1977 | Eggmann et al. | 415/213.1 |
| 4,149,826 A | * | 4/1979 | Torstenfelt | 60/800 |
| 6,708,500 B2 | * | 3/2004 | Huster et al. | 60/797 |

FOREIGN PATENT DOCUMENTS

| | | | |
|---|---|---|---|
| GB | 2018910 | * | 10/1979 |
| JP | 60-10838 U | | 1/1985 |

OTHER PUBLICATIONS

Webpage: "Math Review #1" from http://cse.ssl.berkeley.edu/bmendez/ay10/2002/notes/REVIEW/math1.html, published 2002.*
Japanese Office Action dated Jun. 1, 2011, issued in corresponding Japanese Patent Application No. 2007-018783.

* cited by examiner

*Primary Examiner* — Ted Kim
(74) *Attorney, Agent, or Firm* — Westerman, Hattori, Daniels & Adrian, LLP

(57) ABSTRACT

There is provided a gas turbine capable of improving the durability of a main shaft by absorbing the deformation of a casing due to heat and pressure and suppressing stresses acting on the main shaft. A link plate 31 of a movable supporting leg 30 that supports a casing 26 of a gas turbine 20 on the turbine 24 side is installed beforehand in an inclined manner at an angle $\theta 1$, whereby the displacement X of a lower casing 26L in the height direction; which occurs between a pin 31a in a top end portion of the link plate 31 and a top surface of a lower casing 26L when the operation status of the gas turbine 20 shifts from a stop condition to an operating condition is compensated for. This prevents a main shaft 25 from changing in the height direction in the part of the movable supporting leg 30 and suppresses bending stresses acting on the main shaft 25.

5 Claims, 6 Drawing Sheets

GAS TURBINE

BACKGROUND OF THE INVENTION

1. Field of the Invention

The present invention relates to a gas turbine and, more particularly, to supporting legs of a casing of a gas turbine.

2. Description of the Related Art

A gas turbine compresses air by a compressor into high-temperature, high-pressure compressed air, and supplies a fuel to this compressed air in a combustor, where the fuel is burned to generate a high-temperature, high-pressure combustion gas. This high-temperature, high-pressure gas is fed into a turbine and the expansion of this high-temperature, high-pressure gas in the turbine causes a main shaft to rotate so as to drive a generator or the like.

In a casing that forms an outer shell of such a gas turbine, thermal deformation due to the heat of internal compressed air and combustion gas and deformation due to inner pressure occurs axially and radially. In order to absorb this axial and radial deformation of the casing, there has hitherto been used a construction which is such that the casing is fixedly supported on the side of one axial end and supported in a displaceable manner on the side of the other end.

For example, in Japanese Utility Model Laid-Open No. 60-10838, as a construction in which the side of the other end of the casing is supported in a displaceable manner, a supporting leg that supports the side of the other end of the casing is slidable along an inclined surface.

There is also a construction as shown in FIG. 4. A casing 2 of a gas turbine 1 is supported, on the compressor 3 side, by a fixed supporting leg 5 that is fixed on a foundation 4, and on a turbine 6 side, by a movable supporting leg 7 that allows the deformation of the casing 2. As shown in FIG. 5, the movable supporting leg 7 is composed of link plates 8 provided on both sides of the casing 2 and a supporting member 9 provided below the casing 2.

The link plate 8 is provided perpendicularly to the foundation 4 in a stop condition of the gas turbine 1, and upper and lower parts thereof are rotatably connected to the casing 2 and the foundation 4, respectively, by pins 8a, 8b. As a result of this, when the casing 2 is axially deformed, the link plate 8 rotates relatively, in the parts of the pins 8a, 8b, with respect to the casing 2 and the foundation 4, and the link plate 8 inclines in a tilting direction, with the pin 8b in the bottom end part serving as the center. This allows axial deformation of the casing 2.

This link plate 8 itself undergoes lateral elastic deformation in FIG. 5, whereby this link plate 8 supports the casing 2 by allowing the radial deformation of the casing 2.

The supporting member 9 allows vertical displacement of the casing 2 while constraining the casing 2 laterally (laterally in the cross-section of the casing 2).

This supporting member 9 is such that a bottomed cylindrical sleeve 9b is integrally provided on the side of one end of a shaft 9a and a sleeve 9c of the same shape is integrally provided on the side of the other end. A lower part of the casing 2 is bonded to the sleeve 9b and the sleeve 9c is fixed to the foundation 4 side. The inside diameter of the sleeves 9b, 9c is larger than the diameter of the shaft 9a, and a clearance is formed between an inner circumferential surface of the sleeves 9b, 9c and an outer circumferential surface of the shaft 9a. Also, a clearance is formed between the sleeve 9b and the sleeve 9c so that the two do not come into contact with each other.

According to such a supporting member 9, when the gap between the foundation 4 and the casing 2 displaces due to radial deformation of the casing 2 and a swing of the casing 2, the shaft 9a undergoes elastic deformation and the sleeves 9b, 9c are relatively displaced vertically. This enables the radial deformation of the casing 2 and the vertical swing of the casing 2 to be absorbed. The shaft 9a is less apt to be axially deformed compared to the elastic deformation of the shaft 9a occurring at this time and, therefore, the casing 2 is laterally constrained.

The casing 2 of the gas turbine 1 is divided into two parts of an upper casing 2a and a lower casing 2b. In the supporting construction using the link plate 8, in order to ensure connecting strength of the link plate 8 to the lower casing 2b, a thick-walled portion 11 is formed below a top surface of the lower casing 2b and a top end portion of the link plate 8 is connected to the lower casing 2b by the pin 8a. For this reason, the top end portion of the link plate 8 is offset below the mating faces of the upper casing 2a and the lower casing 2b, i.e., the central axis C of a main shaft 10.

In such a construction, the radial deformation of the lower casing 2b occurs between the top end portion of the link plate 8 (the part connected to the lower casing 2b by the pin 8a) and the top surface of the lower casing 2b as well. For this reason, when the operation status of the gas turbine 1 shifts from a stop condition to an operating condition and the temperature of the casing 2 rises, the central axis C of the main shaft 10 is displaced upward with respect to the foundation 4 as shown in FIG. 6.

At this time, within the gas turbine 1, the temperature and pressure of the internal air rise from the compressor 3 side toward the turbine 6 side and also the amount of deformation occurring in the casing 2 becomes more remarkable on the turbine 6 side than on the compressor 3 side. For this reason, the position of the central axis C of the main shaft 10 becomes higher on the turbine 6 side, which is supported by the movable supporting leg 7, than on the compressor 3 side, which is supported by the fixed supporting leg 5. As a result, a bending stress acts on the main shaft 10. This bending stress results in repeated stressing of the main shaft 10 in the tension and compression directions as the main shaft 10 rotates, and has an effect on the durability of the main shaft 10.

The present invention has been accomplished on the basis of such a technical challenge and has as its object the provision of a gas turbine capable of improving the durability of a main shaft by absorbing the deformation of a casing due to heat and pressure and suppressing stresses acting on the main shaft.

SUMMARY OF THE INVENTION

The present invention accomplished on the basis of this object provides a gas turbine including a compressor that compresses air, a combustor that supplies a fuel to the air compressed by the compressor and burns the fuel to generate a combustion gas, and a turbine that is rotatably driven by the expansion of the combustion gas generated in the combustor, in which a casing forming an outer shell of the gas turbine is supported on a foundation by a first supporting leg that supports the compressor side and a second supporting leg that supports the turbine side. The first supporting leg supports the casing in a fixed condition with respect to the foundation. The second supporting leg supports the casing in a movable condition so as to allow axial and radial deformation and displacement of the casing and is installed beforehand in an inclined manner at a predetermined angle θ to a surface orthogonal to an axis line of the casing when the gas turbine is in a stop condition.

In the gas turbine, the casing is such that because the temperature thereof is higher on the turbine side than on the compressor side, the deformation of the casing due to heat is concentrated on the turbine side, which is supported by the second supporting leg, when a temperature rise of the casing occurs due to the operation of the gas turbine.

In this connection, because the second supporting leg is such that top and bottom end portions thereof are rotatably connected to the foundation and the casing by use of pins, the inclination angle of the second supporting leg changes when axial and radial deformation and displacement of the casing occurs, and this enables the axial and radial deformation and displacement of the casing to be allowed.

The second supporting leg is such that the top end portion thereof is connected to the casing in a position below a central axis of the casing. In this case, when the operation status of the gas turbine shifts from a stop condition to an operating condition, vertical deformation occurs in the casing between the height of the central axis and the position (height) where the casing is connected to the second supporting leg, but this deformation can be absorbed because the second supporting leg becomes inclined to a direction in which the inclination angle increases further when the operation status of the gas turbine shifts from a stop condition to an operating condition. That is, by use of the second supporting leg, it is possible to absorb an axial displacement of the casing and a displacement of the height of the central axis of the casing resulting from a temperature change occurring when the operation status of the gas turbine shifts from a stop condition to an operating condition. As a result, it is possible to maintain the supporting height of the main shaft in the casing constant and to suppress stresses acting on the main shaft.

It is preferred that the angle θ provided when the second supporting leg is installed in an inclined manner be approximately $\theta=\tan^{-1}(\Delta H/\Delta L)$ In this equation, ΔL denotes the axial displacement of the casing on the second supporting leg side resulting from a temperature change occurring when the operation status of the gas turbine shifts from a stop condition to an operating condition and ΔH denotes the displacement of the height of the central axis of the casing on the second supporting leg side resulting from a temperature change occurring when the operation status of the gas turbine shifts from a stop condition to an operating condition. Incidentally, because this equation is an approximate expression, the angle θ may be found by performing more precise calculations on the basis of the sizes of the casing and the supporting legs.

Furthermore, to resist an overturning moment acting on the casing, a bias may be provided in a seating face of the first supporting leg.

According to the present invention, by installing the second supporting leg that supports the turbine side in an inclined manner, it is possible to absorb the deformation of the casing when the operation status of the gas turbine shifts from a stop condition to an operating condition. This can prevent the main shaft in the casing from becoming deformed in the height direction, with the result that the durability of the main shaft can be improved by preventing bending stresses from acting on the main shaft. Furthermore, it becomes also possible to suppress variations in load in bearings that support the main shaft and to reduce problems in gas turbine design.

DETAILED DESCRIPTION OF THE PREFERRED EMBODIMENTS

The present invention will be described in detail below on the basis of an embodiment shown in the accompanying drawings.

Figure 1:
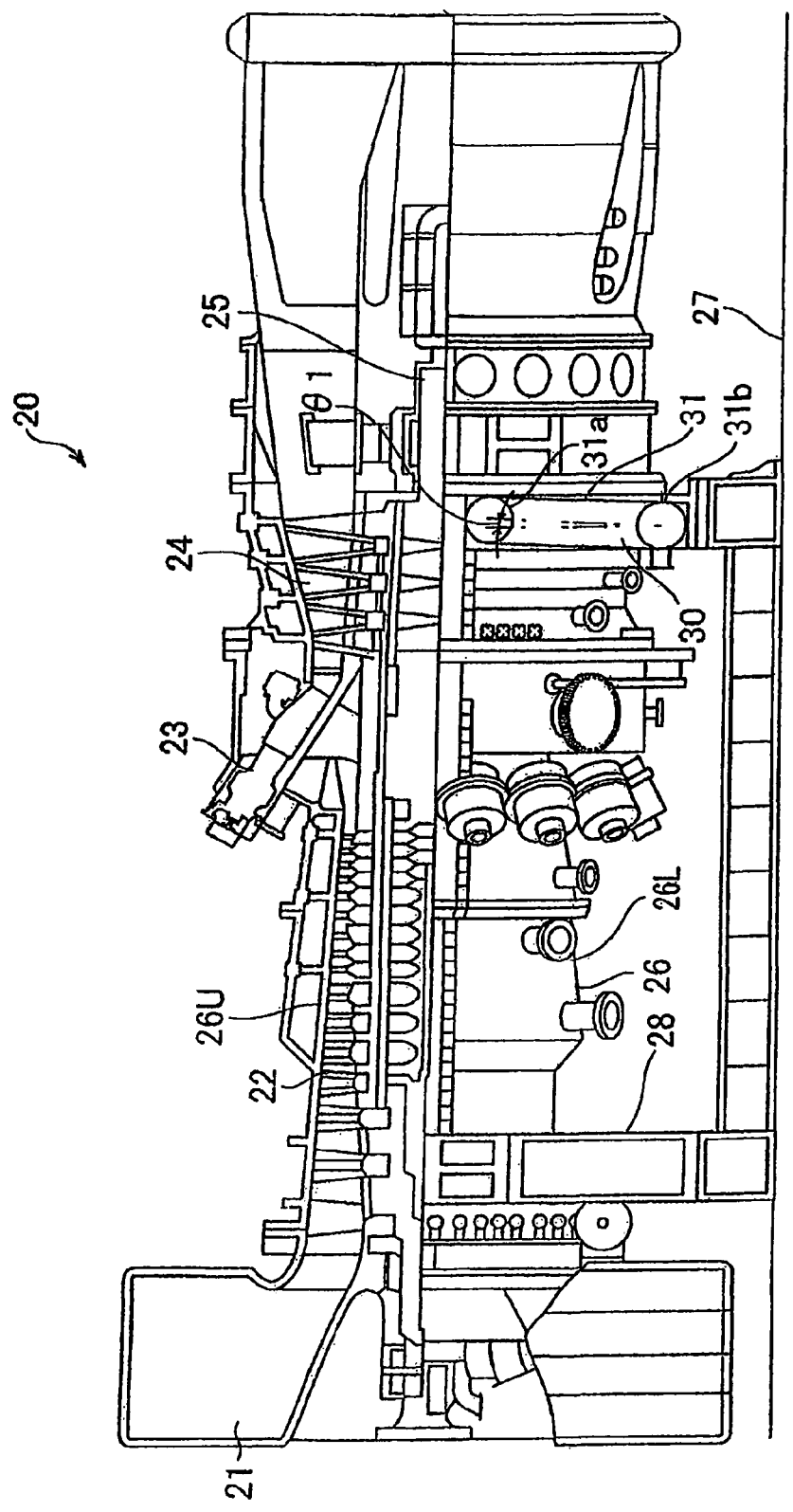
FIG. 1 is a diagram showing the construction of a gas turbine in this embodiment.

FIG. 1 is a diagram for explaining the general construction of a gas turbine 20 in this embodiment.

As shown in FIG. 1, the gas turbine 20 is provided, from the upstream side of air flow to the downstream side thereof, with an air intake port 21, a compressor 22, a combustor 23 and a turbine 24.

Air that is taken in from the air intake port 21 is compressed by the compressor 22 into high-temperature, high-pressure compressed air, which is fed into the combustor 23. In the combustor 23, a gaseous fuel, such as natural gas, or a liquid fuel, such as kerosene and light oil, is supplied to this compressed air and the fuel is burned, whereby a high-temperature, high-pressure gas is generated. This high-temperature, high-pressure gas is injected into the turbine 24 and expands within the turbine 24, thereby rotating the turbine 24. A generator or the like connected to a main shaft 25 of the gas turbine 20 is driven by the rotation energy of the turbine 24.

A casing 26 of this gas turbine 20 is supported on the compressor 22 side by a fixed supporting leg (a first supporting leg) 28 fixed on a foundation 27, and supported on the turbine 24 side by a movable supporting leg (a second supporting leg) 30 that allows the deformation of the casing 26. The casing 26 of the gas turbine 20 is divided into two parts, an upper casing 26U and a lower casing 26L, and the lower casing 26L is supported by the fixed supporting leg 28 and the movable supporting leg 30.

The movable supporting leg 30 is composed of link plates 31 provided on both sides of the casing 26 and a supporting member 9 (see FIG. 5) provided below the casing 26.

Figure 5:
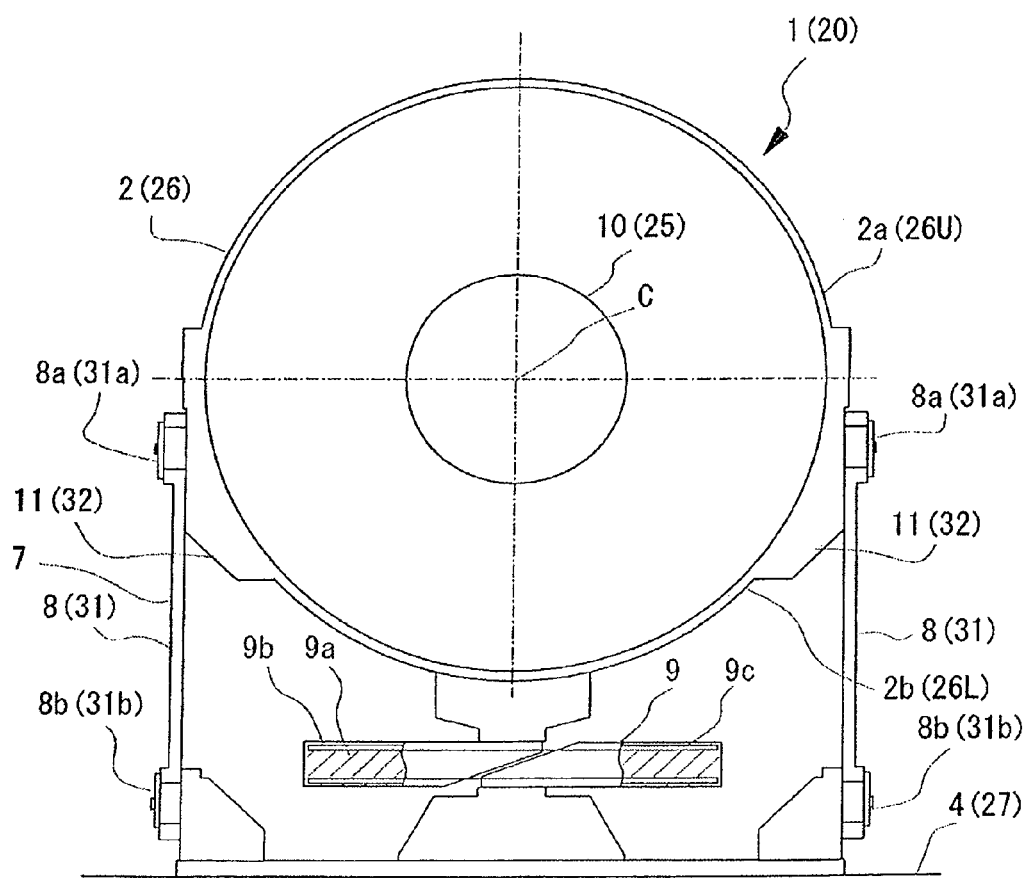
FIG. 5 is a cross-sectional view showing a supporting construction of the gas turbine.
Figure 6:
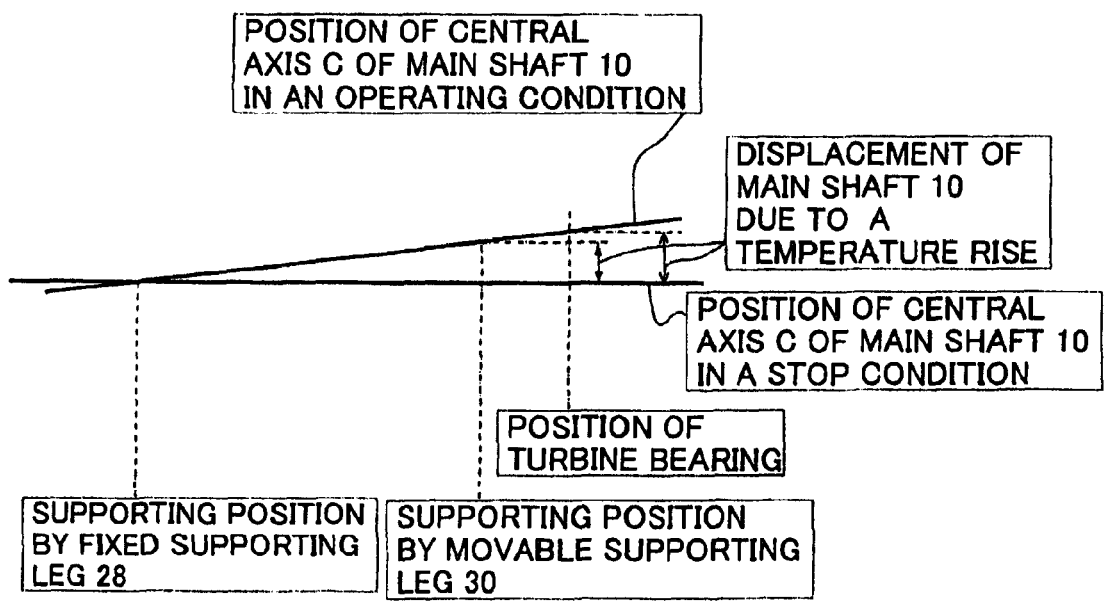
FIG. 6 is a diagram showing the displacement of a main shaft of the gas turbine.

The link plate 31 is such that top and bottom parts thereof are rotatably connected to the casing 26 and the foundation 27, respectively, by pins 31a, 31b. In order to ensure connecting strength of the link plate 31 to the lower casing 26L, as shown in FIG. 5, a thick-walled portion 32 is formed on an outer circumferential surface of the lower casing 26L below a top surface of the lower casing 26L and the top end portion of this link plate 31 is connected in this thick-walled portion 32 by the pin 31a. For this reason, the top end portion of the link plate 31 is offset below the mating faces of the upper casing 26U and the lower casing 26L, i.e., the central axis C of the main shaft 25.

On the circumference of the pin 31a on the casing 26 side, a flow path (not shown) through which a cooling medium is caused to flow is formed so that the heat of the casing 26 is prevented from being transmitted to the link plate 31 via the pin 31a.

When the operation status of the gas turbine 20 shifts from a stop condition to an operating condition and the casing 26 is axially deformed due to a temperature rise in the casing 26, the link plate 31 rotates relatively, in the parts of the pins 31a, 31b, with respect to the casing 26 and the foundation 27, and the link plate 31 inclines in a tilting direction, with the pin 31b in the bottom end part serving as the center, thereby absorbing the axial displacement.

Incidentally, the radial deformation of the casing 26 is absorbed by the elastic deformation of the link plate 31 and the supporting member 9 in the same manner as in the case shown in FIG. 5.

Figure 2:
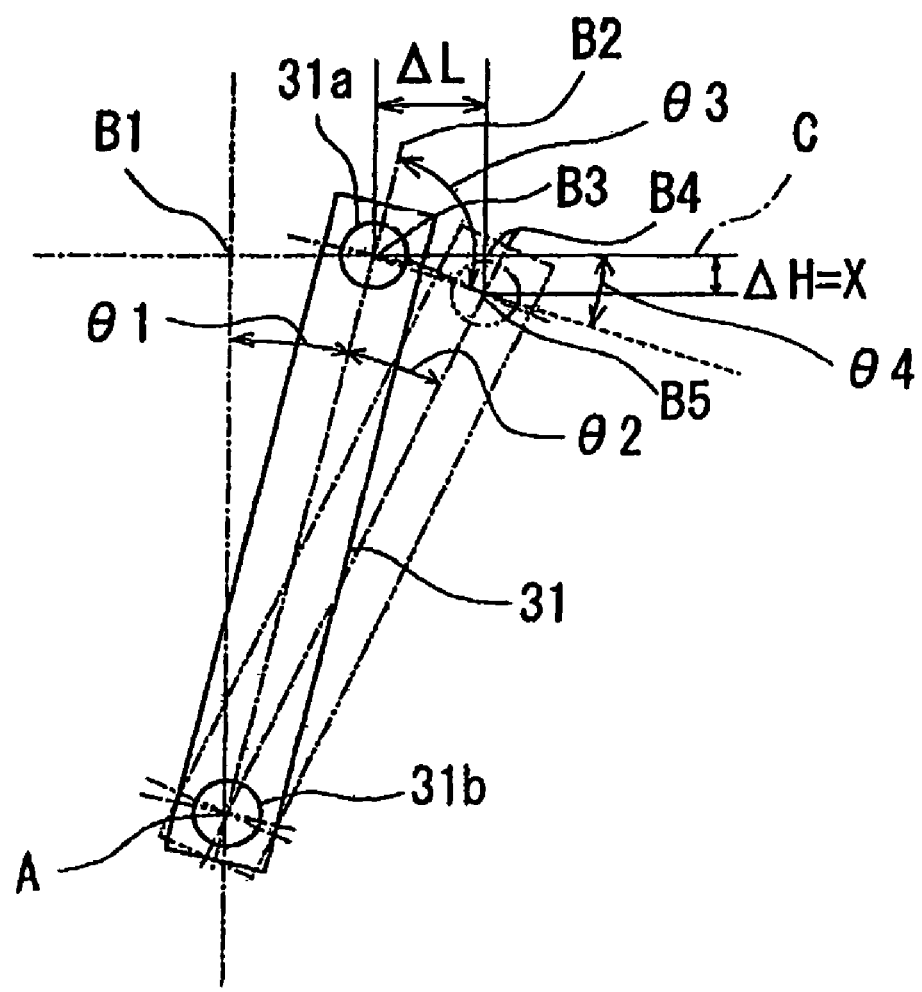
FIG. 2 is a diagram showing the condition of a link plate of a movable supporting leg observed when the gas turbine is in a stop condition and in an operating condition.

As shown in FIGS. 1 and 2, the link plate 31 in a stop condition of the gas turbine 20 is provided in an inclined manner at a prescribed angle θ1 toward the downstream side of the flow direction of combustion gas, with the pin 31b on the foundation 27 side serving as the center with respect to the reference surface of the foundation 27 (the axis line of the gas turbine 20). This is intended for compensating for the displacement X of the lower casing 26L in the height direction, which occurs between the pin 31a in the top end portion of the link plate 31 and the top surface of the lower casing 26L when the operation status of the gas turbine 20 shifts from a stop condition to an operating condition. Incidentally, at this time, dimensional changes due to thermal change occur not only in the casing 26, but also in the link plate 31 and, therefore, the displacement X is a relative difference therebetween.

Thus, if the link plate 31 is inclined beforehand at an angle θ1 when the gas turbine 20 is in a stop condition, the casing 26 is axially displaced when the operation status of the gas turbine shifts to an operating condition and the internal temperature rises, and the link plate 31 rotates by an angle θ2 around the pin 31b on the bottom end side as a center and becomes inclined. At this time, when the link plate 31 rotates by the angle θ2 and becomes inclined, in the position of the pin 31a on the top end side, the casing 26 is axially displaced by ΔL and is displaced by ΔH in the height direction. The angle θ1 is set so that this displacement ΔH in the height direction corresponds to the displacement X of the lower casing 26L in the height direction, which occurs between the pin 31a in the top end portion of the link plate 31 and the top surface of the lower casing 26L (i.e., the height of the central axis C of the main shaft 25) when the operation status of the gas turbine 20 shifts from a stop condition to an operating condition.

From the axial displacement ΔL and radial displacement (height-direction) displacement ΔH of the casing 26, which occur in the position of the pin 31a on the casing 26 side due to a temperature difference between a temperature in a stop condition of the gas turbine 20 and a temperature in an operating condition of the gas turbine 20, the angle θ1 at which the link plate 31 is inclined can be approximately defined by $\theta1=\tan^{-1}(\Delta H/\Delta L)$.

The reason why the angle θ1 can be defined by this equation is as follows. That is, in FIG. 2, the angle θ3 obtained by connecting points B2, B3 and B5, which exceeds 90° slightly, is approximately regarded as substantially 90°, because the displacements ΔL and ΔH are sufficiently small compared to the length AB1 of the movable supporting leg 30. Then, the angle θ4 obtained by connecting points B4, B3 and B5 is almost equal to the angle θ1 obtained by connecting points B1, A and B3, and can be expressed by θ1≈θ4, and the above-described approximate expression is obtained by this.

The temperature in each part in the interior of the casing 26 of the gas turbine 20 is always substantially constant when the gas turbine is in an operating condition and, therefore, the ratio of the axial displacement ΔL to the radial displacement ΔH, which are described above, can be fixed at a constant value.

For example, when, in the position of the pin 31a on the top end side, the casing 26 is axially displaced by ΔL=20 mm and is displaced in the height direction by ΔH=1.2 mm, it is preferred that θ1=3.4°.

As described above, the link plate 31 is installed beforehand in an inclined manner at an angle θ1, whereby it is possible to compensate for the displacement X of the lower casing 26L in the height direction, which occurs between the pin 31a in the top end portion of the link plate 31 and the top surface of the lower casing 26L when the operation status of the gas turbine 20 shifts from a stop condition to an operating condition. This enables the main shaft 25 to be prevented from changing in the height direction in the part of the movable supporting leg 30 and enables main shaft 25 to be constantly supported at the same height as the part of the fixed supporting leg 28. As a result, it becomes possible to prevent bending stresses from acting on the main shaft 25 and it becomes possible to improve the durability of the main shaft 25.

Figure 3:
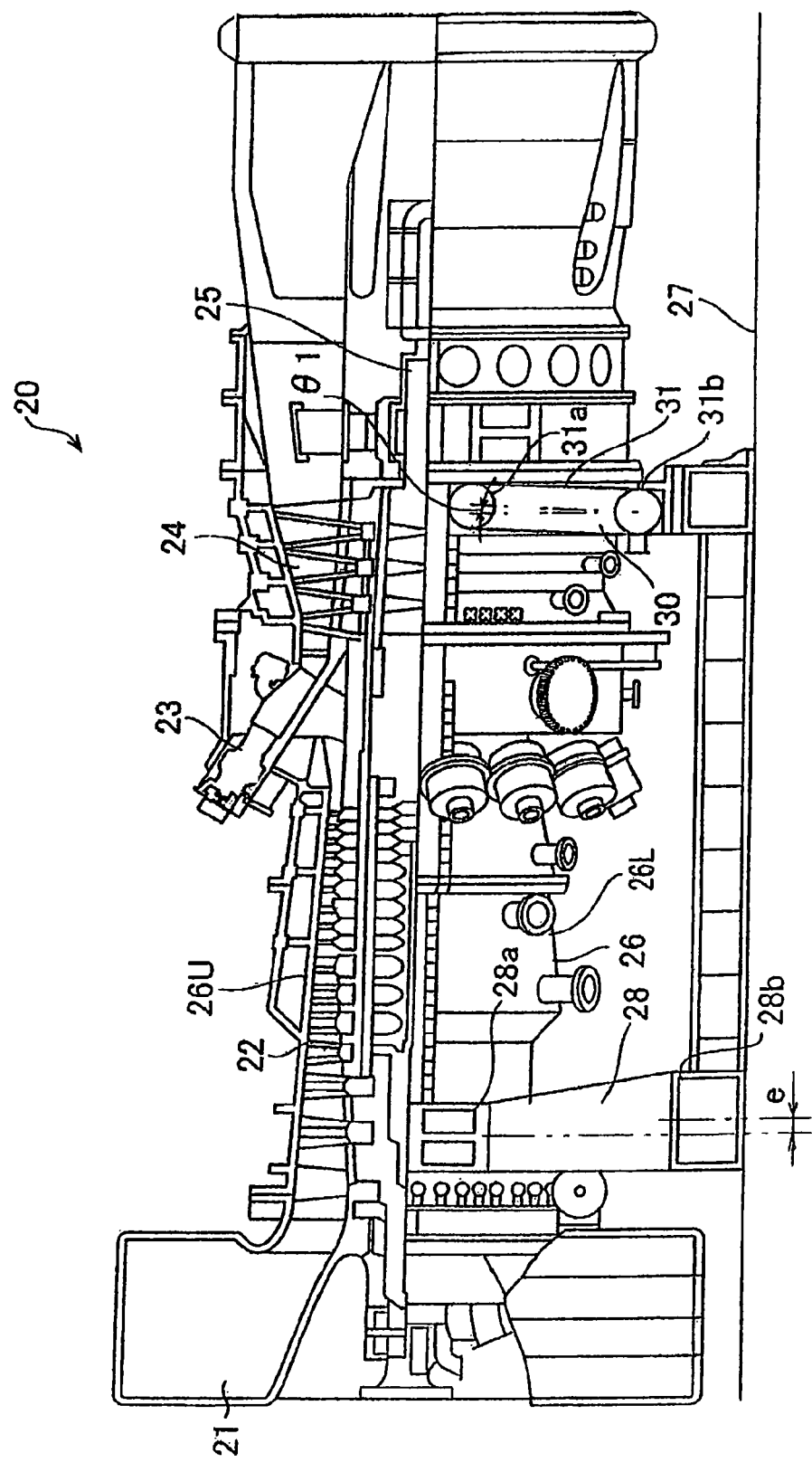
FIG. 3 is a diagram showing an example in which a bias is provided in a seating face of a fixed supporting leg in the gas turbine of this embodiment.
Figure 4:
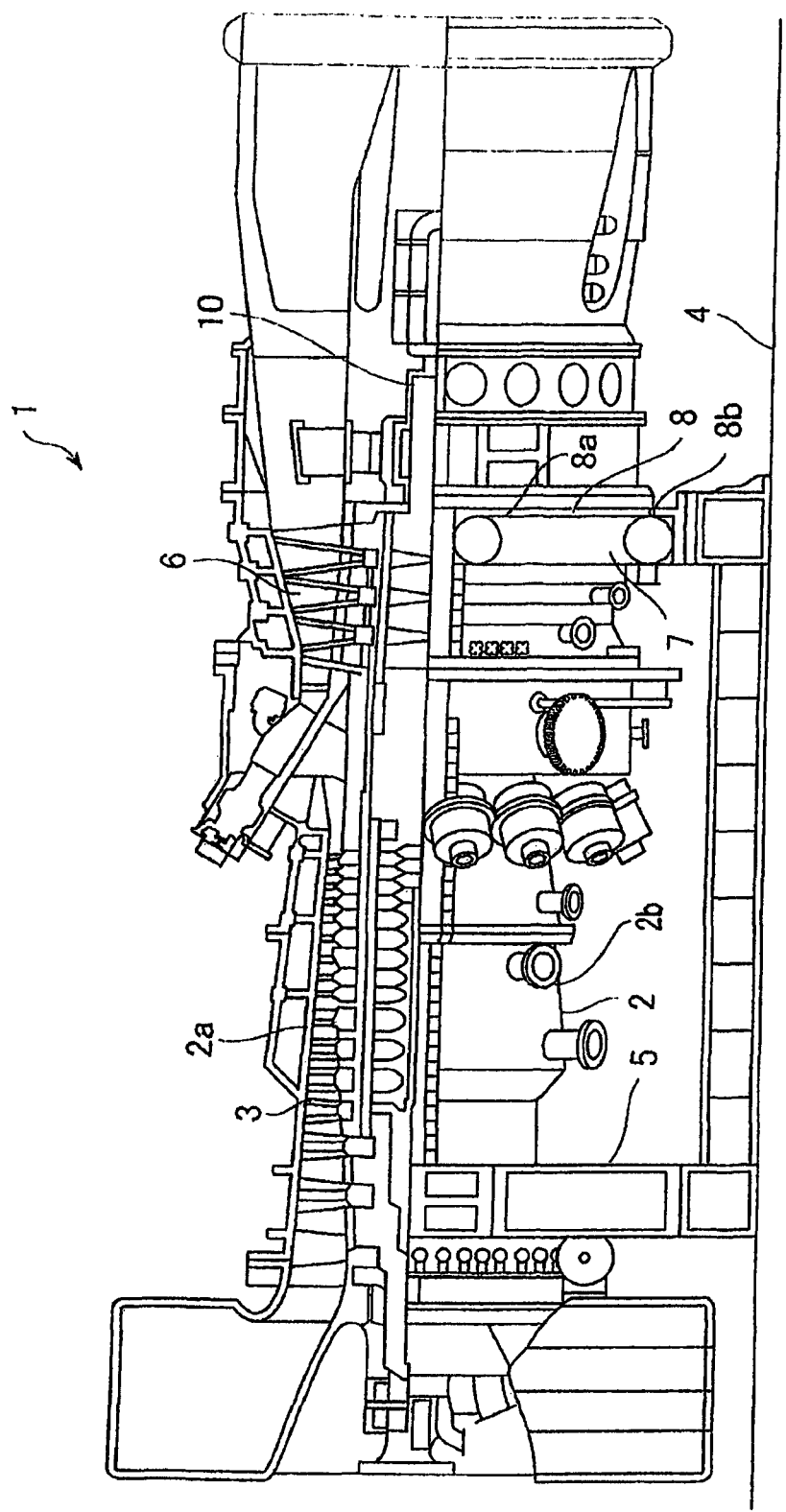
FIG. 4 is a diagram showing the construction of a conventional gas turbine.

Incidentally, because the gas turbine 20 is installed by inclining the movable supporting leg 30 on the turbine 24 side, i.e., the link plate 31, an overturning moment is generated in the whole casing 26 of the gas turbine 20 when the gas turbine 20 is in a stop condition. Therefore, as shown in FIG. 3, a bias "e" is provided at the center of the bottom end 28b of the fixed supporting leg 28 of the compressor 22 side on the seating face side in a direction withstanding the overturning moment with respect to the center of the top end 28a side of the fixed supporting leg 28, whereby it is possible to increase a resisting force against the overturning moment of the casing 26. Incidentally, the size of this bias "e" can be appropriately set according to the mass and size of the casing 26 and the main shaft 25, the positional relationship between the fixed supporting leg 28 and the movable supporting leg 30, and the like.

Incidentally, although the construction of the gas turbine 20 was described in the above-described embodiment, it is possible to appropriately change the construction of each part of the gas turbine 20 within the scope of the gist of the present invention.

In addition, it is possible to make a choice from constructions mentioned in the above-described embodiment or appropriately change these constructions into other constructions so long as this does not depart from the gist of the present invention.

What is claimed is:

1. A gas turbine including a compressor that compresses air, a combustor that supplies a fuel to the air compressed by the compressor and burns the fuel to generate a combustion gas, and a turbine that is rotatably driven by the expansion of the combustion gas generated in the combustor, wherein a casing forming an outer shell of the gas turbine is supported on a foundation by a first supporting leg that supports the compressor side and a second supporting leg that supports the turbine side, wherein the first supporting leg supports the casing in a fixed condition with respect to the foundation, and a bias being provided in a seating face of the first supporting leg, and wherein the second supporting leg supports the casing in a movable condition so as to allow axial and radial deformation and displacement of the casing and is installed beforehand in an inclined manner at a predetermined angle θ to a surface orthogonal to an axis line of the casing when the gas turbine is in a stop condition.

2. The gas turbine according to claim 1, wherein the second supporting leg is such that top and bottom end portions thereof are rotatably connected to the foundation and the casing by use of pins.

3. The gas turbine according to claim 1, wherein the second supporting leg is such that the top end portion thereof is connected to the casing in a position below a central axis of the casing.

4. The gas turbine according to claim 3, wherein the second supporting leg becomes inclined to a direction in which the inclination angle increases further when the operation status of the gas turbine shifts from a stop condition to an operating condition, whereby the second supporting leg absorbs an axial displacement of the casing and a displacement of the height of the central axis of the casing resulting from a temperature change occurring when the operation status of the gas turbine shifts from a stop condition to an operating condition.

5. The gas turbine according to claim 1, wherein the angle $\theta$ is given by $\theta = \tan^{-1}(\Delta H/\Delta L)$ when the axial displacement of the casing on the second supporting leg side resulting from a temperature change occurring when the operation status of the gas turbine shifts from a stop condition to an operating condition is denoted by $\Delta L$ and the displacement of the height of the central axis of the casing on the second supporting leg side resulting from the temperature change is denoted by $\Delta H$.

* * * * *